US011712744B2

(12) United States Patent
Msakni Malouche et al.

(10) Patent No.: US 11,712,744 B2
(45) Date of Patent: Aug. 1, 2023

(54) ELECTROLYTE FOR ELECTROCHEMICAL MACHINING OF γ-γ" NICKEL-BASED SUPERALLOYS

(71) Applicants: SAFRAN AIRCRAFT ENGINES, Paris (FR); UNIVERSITE DE LORRAINE, Nancy (FR); CENTRE NATIONAL DE LA RECHERCHE SCIENTIFIQUE, Paris (FR)

(72) Inventors: Mariem Msakni Malouche, Moissy-Cramayel (FR); Janvier Lecomte, Moissy-Cramayel (FR); Mickael Rancic, Moissy-Cramayel (FR); Nicolas Stein, Metz (FR); Clotilde Boulanger, Coin les Cuvry (FR)

(73) Assignees: SAFRAN AIRCRAFT ENGINES, Paris (FR); CENTRE NATIONAL DE LA RECHERCHE SCIENTIFIQUE, Paris (FR); UNIVERSITE DE LORRAINE, Nancy (FR)

( * ) Notice: Subject to any disclaimer, the term of this patent is extended or adjusted under 35 U.S.C. 154(b) by 152 days.

(21) Appl. No.: 17/290,945

(22) PCT Filed: Dec. 17, 2019

(86) PCT No.: PCT/FR2019/053110
§ 371 (c)(1),
(2) Date: May 3, 2021

(87) PCT Pub. No.: WO2020/128294
PCT Pub. Date: Jun. 25, 2020

(65) Prior Publication Data
US 2021/0370426 A1  Dec. 2, 2021

(30) Foreign Application Priority Data
Dec. 17, 2018 (FR) ...................... 1873039

(51) Int. Cl.
  *B23H 3/08*  (2006.01)
  *C25F 3/22*  (2006.01)
  *C25D 5/18*  (2006.01)

(52) U.S. Cl.
  CPC ............... *B23H 3/08* (2013.01); *C25F 3/22* (2013.01); *C25D 5/18* (2013.01)

(58) Field of Classification Search
  CPC .......... C25F 3/22; B23H 3/08; B23H 2300/10
  See application file for complete search history.

(56) References Cited

U.S. PATENT DOCUMENTS

| 3,634,217 | A | * | 1/1972 | Aoun | ........................ | C25F 3/02 |
| | | | | | | 205/717 |
| 6,835,299 | B1 | * | 12/2004 | Tchugunov | .............. | B23H 7/38 |
| | | | | | | 205/672 |
| 2009/0139875 | A1 | | 6/2009 | Kim et al. | | |
| 2016/0362810 | A1 | | 12/2016 | Trimmer et al. | | |
| 2019/0262923 | A1 | * | 8/2019 | Trimmer | .................. | B23H 5/14 |
| 2019/0292681 | A1 | * | 9/2019 | Bagehorn | ............... | B22F 10/28 |

FOREIGN PATENT DOCUMENTS

| CN | 101532164 B | | 12/2010 | | |
| CN | 106048704 A | * | 10/2016 | | |
| CN | 107214208 A | | 9/2017 | | |
| CN | 108118388 A | * | 6/2018 | ............... | C25F 3/22 |
| EP | 2 947 183 A1 | | 11/2015 | | |
| RU | 2 489 235 C1 | | 8/2013 | | |
| SU | 390 902 A1 | | 7/1973 | | |
| SU | 1 278 135 A1 | | 12/1986 | | |

OTHER PUBLICATIONS

CN 108118388 A—translation (Year: 2018).*
CN 106048704 A—translation (Year: 2016).*
Rectilinear Motion (https://web.archive.org/web/20211026101717/https://byjus.com/physics/rectilinear-motion-of-particles/) (Year: 2021).*
CN 108930058 A—translation provided (Year: 2018).*
International Search Report as issued in International Patent Application No. PCT/FR2019/053110, dated Jun. 24, 2020.
Surekar, S. H., et al., "Optimization of Parameters in Electrochemical Machining of Ni-Base Superalloy," International Journal of Research in Aeronautical and Mechanical Engineering, vol. 4, Issue 1, Jan. 2016, pp. 72-80.
Search Report as issued in French Patent Application No. 1873039, dated Oct. 10, 2019.

* cited by examiner

*Primary Examiner* — Nicholas A Smith
(74) *Attorney, Agent, or Firm* — Pillsbury Winthrop Shaw Pittman LLP

(57) ABSTRACT

An electrolyte for the electrochemical machining of a γ-γ" nickel-based superalloy, includes NaNO3 in a content of between 10% and 30% by weight relative to the total weight of the electrolyte; a complexing agent selected from sulfosalicylic acid at a pH of between 3 and 10 and nitrilotriacetic acid at a pH of between 7 and 14, the complexing agent being present in a content of between 1% and 5% by weight relative to the total weight of the electrolyte; optionally, an anionic surfactant in a content of between 1% and 5% by weight relative to the total weight of the electrolyte; optionally, NaOH in order to obtain the desired pH; and an aqueous solvent.

10 Claims, No Drawings

ELECTROLYTE FOR ELECTROCHEMICAL MACHINING OF γ-γ" NICKEL-BASED SUPERALLOYS

CROSS-REFERENCE TO RELATED APPLICATIONS

This application is the U.S. National Stage of PCT/FR2019/053110, filed Dec. 17, 2019, which in turn claims priority to French patent application number 1873039 filed Dec. 17, 2018. The content of these applications are incorporated herein by reference in their entireties.

TECHNICAL FIELD

This invention relates to the field of electrolytes for the electrochemical machining (ECM) of γ-γ" (gamma-gamma double prime)-type nickel-based superalloys.

PRIOR ART

ECM is a nonconventional machining process. This process is mainly aimed at electrically conductive materials. The principle of ECM is based on the anodic dissolution of a workpiece (anode) using a tool referred to as a cathode in the presence of an ionically conductive electrolyte. The inter-electrode distance (gap) is defined as the distance between the workpiece to be machined and the cathode. It is of the order of 0.1 to 1 mm.

Precision electrochemical machining (PECM) is based on the same principle of anodic oxidation of the metal. Nevertheless, it is distinguished from ECM by the imposition of a pulsed and non-continuous current. The current is synchronized with an oscillation of the cathode. This oscillation is accompanied by a rectilinear translational movement, but also by a smaller gap (10 to 200 μm). The process thus becomes sensitive to the formation of hydrogen bubbles which form at the cathode and disturb the efficiency of the process.

It is practice nowadays for the machining of γ-γ"-type nickel-based superalloys to be realized in an $NaNO_3$-based electrolyte solution at concentrations of between 8% and 20% by weight relative to the total weight of the solution.

When carrying out the ECM, and also its derivatives (precision ECM PECM, electrochemical deposition ECD, electrochemical grinding ECG) in $NaNO_3$ medium, the anodic dissolution of the γ-γ" superalloys generates soluble dissolution products but also insoluble products, which form a sludge a large portion of which remains adhered to the electrochemically machined surfaces. The latter consists mainly of oxides and hydroxides which obstruct the optimal reaction of the dissolution. In addition, certain phases constituting these superalloys, such as the γ" phases, the carbides and the nitrocarbides, are insoluble, and during the machining become dislodged under the action of the flow of electrolyte, which forms a rough surface.

All of these consequences lead to a reduction in the efficiency as well as to additional operations for reconditioning the machined surfaces (chemical pickling, abrasion polishing).

This dissolution is also accompanied by the formation of dihydrogen at the surface of the cathode, which leads to a fluctuation in and a disturbance of the process. These formed gas bubbles lead to a disturbance of the process due to the small distance between the cathode and the workpiece to be machined (gap of between 10 μm and 200 μm for precision electrochemical machining (PECM)), which reduces the efficiency.

An electrolyte for the electrochemical machining of certain metals (Fe, Cu, Ni, Al, Sn, Cr and Zn) as well as alloys thereof is known. This electrolyte is mainly based on the addition of complexing agents which may be EDTA, HEDTA, NTA or citric acid with a mixture of inorganic salt based on $NaNO_3$, NaCl, $NaClO_4$, $Na_2SO_4$, $KNO_3$, KCl, $KClO_4$, $K_2SO_4$, $LiNO_3$, LiCl, $LiClO_4$, and $Li_2SO_4$ for a concentration range extending from 100 g/L to 500 g/L. The electrolyte also contains a reducing agent such as ascorbic acid. However, complexing agents do not make it possible to complex Nb, the major element of the γ" inclusions, especially since the NTA was used in a pH range of from 2 to 7, which does not allow a good complexing action.

There is thus a need to find a novel electrolyte intended for the electrochemical machining of γ-γ"-type nickel-based superalloys which does not exhibit the disadvantages of the prior art.

DISCLOSURE OF THE INVENTION

The inventors have thus discovered, surprisingly, that an electrolyte based on $NaNO_3$ and having a particular composition was perfectly suited to the electrochemical machining of γ-γ"-type nickel-based superalloys, without exhibiting the disadvantages of the prior art, and in particular that this electrolyte makes it possible to reduce the overvoltage of the hydrogen produced at the surface of the cathode, to increase the dissolution efficiency, and produces an improved effect on the reduction of the roughness.

The present invention thus relates to an electrolyte for the electrochemical machining of a γ-γ" nickel-based superalloy, comprising, advantageously essentially consisting of, in particular consisting of:

$NaNO_3$ in a content of between 10% and 30% by weight relative to the total weight of the electrolyte;

a complexing agent selected from sulfosalicylic acid at a pH of between 3 and 10, advantageously at a pH of 6, and nitrilotriacetic acid (NTA) at a pH of between 7 and 14, advantageously at a pH of 10, the complexing agent being present in a content of between 1% and 5%, advantageously between 2% and 3%, by weight relative to the total weight of the electrolyte;

optionally, an anionic surfactant in a content of between 1% and 5% by weight relative to the total weight of the electrolyte;

optionally, NaOH in order to obtain the desired pH (depending on the complexing agent chosen);

an aqueous solvent, advantageously water.

The γ-γ" nickel-based superalloys are, for example, Inconel 718® sold by the company Alloy Wire International. This is a precipitation-hardenable nickel-iron-chromium alloy having a high creep rupture strength at elevated temperature of approximately 700° C., advantageously having the following composition in % by weight: Ni 50-55, Cr 17-21, Mo 2.8-3.3, Nb 4.75-5.5, Ti 0.65-1.15, Al 0.2-0.8, C≤0.08, Mn≤0.35, Si≤0.35, P≤0.015, S≤0.015, Co≤1.00, Ta≤0.05, B≤0.006, Cu≤0.30, Pb≤0.0005, Bi≤0.00003, Se≤0.003 and the balance being Fe.

Sulfosalicylic acid at a pH of between 3 and 10, advantageously at a pH of 6, makes it possible to complex the major element of the $Ni_3Nb$ phases, this being niobium which is insoluble in nitrate medium alone.

NTA makes it possible to more easily complex all of the metal cations such as Ni, Al, Fe, Cr at a pH of between 7 and 14, advantageously for an optimal pH of 10.

Advantageously, the complexing agent is sulfosalicylic acid at a pH of between 3 and 10, more advantageously at a pH of 6.

An anionic surfactant may be present in the electrolyte. It makes it possible to reduce the surface tension and to facilitate the dissolution reaction. It also makes it possible to reduce the overvoltage of the hydrogen produced at the surface of the cathode and which causes disturbances during the machining process, and to increase the dissolution efficiency. In an advantageous embodiment, the anionic surfactant is selected from the group consisting of saccharin, sodium dodecylsulfate, sulfonates, carboxylates, sulfocinates, phosphates, and mixtures thereof; advantageously it is selected from the group consisting of saccharin, sodium dodecylsulfate, and mixtures thereof.

The electrolyte according to the invention makes it possible to ensure a homogeneous anodic dissolution of all the phases of the γ-γ" nickel-based superalloy. It also makes it possible to guarantee good surface finishes with an optimization of the efficiency and of the dissolution rate and a reduction of the residues formed.

The electrolyte according to the invention is prepared by methods well known to those skilled in the art, by simple addition and mixing of the various components in the aqueous solvent. If NaOH is needed, it is added at the end until the target pH is reached.

The present invention additionally relates to the use of the electrolyte according to the invention for the electrochemical machining of a γ-γ" nickel-based superalloy, in particular the precision electrochemical machining of a γ-γ" nickel-based superalloy, the electrochemical deposition (ECD) of a γ-γ" nickel-based superalloy or the electrochemical grinding (ECG) of a γ-γ" nickel-based superalloy.

It further relates to a process for the electrochemical machining of a γ-γ" nickel-based superalloy, comprising the following successive steps:

a—providing a γ-γ" nickel-based superalloy workpiece as an anode;

b—providing a tool as a cathode;

c—providing an electrolyte according to the present invention;

d—immersing the anode and the cathode in the electrolyte with an inter-electrode distance of between 0.1 and 1 mm;

e—applying a continuous current between the anode and the cathode so as to achieve the anodic dissolution of the γ-γ" nickel-based superalloy workpiece;

f—recovering the machined workpiece obtained in step e).

The tool that can be used as a cathode in step b) of the electrochemical machining process according to the invention is mainly made of stainless steel, but can also be made of titanium alloys, platinum alloys, copper-based alloys or copper-tungsten alloys.

The current of step e) can have a voltage which can range from 4 to 30 V. Its current density is advantageously 12.8 A/cm². The application of the continuous current in the context of the electrochemical machining process according to the invention makes it possible to circulate the electrolyte continuously between the cathode and the anode during step e) with a sufficient flow rate, in particular obtained using a pressure of between 3.5 and 4 bar (between 350 000 and 400 000 Pa), in order to evacuate the residues of the anodic dissolution (sludge and dihydrogen) and to guarantee an optimal dissolution rate. The dissolution rate is the difference in mass before and after machining divided by the machining time. It is advantageously greater than or equal to 80 mg/min.

The optimum dissolution efficiency advantageously obtained by the process according to the invention is greater than or equal to 60% by mass. It is calculated as follows:

Only nickel was considered as electroactive element for the sake of simplicity. The anodic reaction is then:

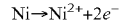

The theoretical mass loss $\Delta W_{theo}$ of the samples is established from the of following relation:

$$\Delta W theo = \frac{M \times I \times t}{n \times F} \quad (1)$$

M being the atomic molar mass of nickel, I being the applied current, t being the duration of the oxidation, n being the valence of the dissolved ions (n=2) and F being the Faraday constant=96 500 C/mol. A Faraday efficiency of 100% has been assumed.

The efficiency is then defined by:

$$\eta = \frac{\Delta W \exp}{\Delta W theo} \quad (2)$$

With $\Delta W_{exp}$ being the difference in mass before and after the test and following a final surface cleaning.

Lastly, the present invention relates to a process for the precision electrochemical machining of a γ-γ" nickel-based superalloy, comprising the following successive steps:

A—providing a γ-γ" nickel-based superalloy workpiece as an anode;

B—providing a tool as a cathode;

C—providing an electrolyte according to the invention;

D—immersing the anode and the cathode in the electrolyte;

E—applying a pulsed current between the anode and the cathode, synchronized with a possible oscillation of the cathode, and accompanied by a possible rectilinear translational movement of the cathode towards the anode making it possible to obtain a minimum inter-electrode distance of 10 to 200 μm, so as to achieve the anodic dissolution of the γ-γ" nickel-based superalloy workpiece;

F—recovering the machined workpiece obtained in step E).

The tool that can be used as a cathode in step B) of the electrochemical machining process according to the invention is mainly made of stainless steel, but can also be made of titanium alloys, platinum alloys, copper-based alloys or copper-tungsten alloys.

The current of step E) can have a voltage which can range from 6 V to 18.7 V. The amplitude of the oscillations can be between 0.2 and 0.8 mm, preferably 0.4 mm. The frequency of the oscillations can be between 27 to 70 Hz and the duration of the pulses can be between 2 and 10 ms.

Step E) can be implemented with or without oscillation of the cathode, advantageously with oscillation of the cathode. If it is implemented without oscillation, continuous displacement of the cathode (only with current pulses) may be present.

Step E) can also be implemented in dynamic mode (with rectilinear translational movement of the cathode towards the anode) or in static mode (without rectilinear translational movement of the cathode towards the anode), with current pulses and optionally with associated oscillations for surface reconditioning or polishing operations (removal <1 mm).

Thus, step E) of the process according to the invention can be implemented in static mode, without rectilinear translational movement of the cathode towards the anode, or step E) of the process according to the invention can be implemented in dynamic mode, with rectilinear translational movement of the cathode towards the anode.

The invention will be better understood in the light of the description of the examples which follow.

EXAMPLES

Three electrolytes were tested in an ECM process under conditions differing slightly from ECM (gap greater than 2 mm and low current density (178 mA/cm$^2$)) on Inconel 718®:

Solution A: 2.35 M NaNO$_3$ in water
Solution B: 2.35 M NaNO$_3$+0.1 M sulfosalicylic acid in water pH 6
Solution C: 2.35 M NaNO$_3$+0.1 M nitrilotriacetic acid in water pH 10.

SEM analyses of the surface finishes obtained after machining made it possible to demonstrate a considerable reduction in corrosion product at the surface by the use of solutions B and C compared to the sodium nitrate medium (solution A). These products become less adherent in the presence of the complexing agent and are easily removable by the flow of electrolyte.

The chemical analyses (concentration in mg/L) of the dissolved elements of the spent electrolytes show that, in the presence of the complexing agent based on sulfosalicylic acid (solution B), niobium is 7 times more soluble than in the nitrate medium alone. Likewise, the Ti and Mo concentrations also increased in the electrolyte, which shows that their passage into solution was facilitated in the presence of the complexing agent. The results are collated in table 1 below.

TABLE 1

|  | Ni | Fe | Cr | Mo | Nb | Ti |
|---|---|---|---|---|---|---|
| Solution A | 11.9 | 4.6 | 4.7 | 0.6 | 0.1 | 0.0 |
| Solution B | 11.5 | 5.1 | 5.0 | 1.0 | 0.7 | 0.1 |

The invention claimed is:

1. An electrolyte for electrochemical machining of a γ-γ" nickel-based superalloy, comprising:
   NaNO$_3$ in a content of between 10% and 30% by weight relative to the total weight of the electrolyte;
   a complexing agent selected from sulfosalicylic acid at a pH of between 3 and 10 and nitrilotriacetic acid at a pH of between 10 and 14, the complexing agent being present in a content of between 1% and 5% by weight relative to the total weight of the electrolyte;
   optionally, an anionic surfactant in a content of between 1% and 5% by weight relative to the total weight of the electrolyte;
   optionally, NaOH in order to obtain the desired pH;
   an aqueous solvent.

2. The electrolyte as claimed in claim 1, comprising the anionic surfactant.

3. The electrolyte as claimed in claim 2, wherein the anionic surfactant is selected from the group consisting of saccharin, sodium dodecylsulphate, sulfonates, carboxylates, sulfocinates, phosphates, and mixtures thereof.

4. The electrolyte as claimed in claim 2, wherein the anionic surfactant is selected from the group consisting of saccharin, sodium dodecylsulphate and mixtures thereof.

5. The electrolyte as claimed in claim 1, wherein the complexing agent is sulfosalicylic acid at a pH of between 3 and 10.

6. A process for the electrochemical machining of a γ-γ" nickel-based superalloy, comprising the following successive steps:
   a—providing a γ-γ" nickel-based superalloy workpiece as an anode;
   b—providing a tool as a cathode;
   c—providing the electrolyte as claimed in claim 1;
   d—immersing the anode and the cathode in the electrolyte with an inter-electrode distance of between 0.1 and 1 mm;
   e—applying a continuous current between the anode and the cathode so as to achieve the anodic dissolution of the γ-γ" nickel-based superalloy workpiece;
   f—recovering the machined workpiece obtained in step e).

7. A process for precision electrochemical machining of a γ-γ" nickel-based superalloy, comprising the following successive steps:
   A—providing a γ-γ" nickel-based superalloy workpiece as an anode;
   B—providing a tool as a cathode;
   C—providing the electrolyte as claimed in claim 1;
   D—immersing the anode and the cathode in the electrolyte;
   E—applying a pulsed current between the anode and the cathode, synchronized with a possible oscillation of the cathode, and accompanied by a possible rectilinear translational movement of the cathode towards the anode making it possible to obtain a minimum inter-electrode distance of 10 to 200 μm, so as to achieve the anodic dissolution of the γ-γ" nickel-based superalloy workpiece;
   F—recovering the machined workpiece obtained in step E).

8. The process as claimed in claim 7, wherein step E) is implemented in static mode, without rectilinear translational movement of the cathode towards the anode.

9. The process as claimed in claim 7, wherein step E) is implemented in dynamic mode, with rectilinear translational movement of the cathode towards the anode.

10. The process as claimed in claim 7, wherein step E) is implemented with oscillation of the cathode.

* * * * *